United States Patent [19]

Hata et al.

[11] 4,036,015
[45] July 19, 1977

[54] MULTI-CYLINDER INTERNAL COMBUSTION ENGINE

[75] Inventors: Yoshitaka Hata, Fujisawa; Giichi Shioyama, Yokosuka; Hidehiro Minami, Yokohama, all of Japan

[73] Assignee: Nissan Motor Co., Ltd., Yokohama, Japan

[21] Appl. No.: 578,129

[22] Filed: May 16, 1975

[30] Foreign Application Priority Data

May 22, 1974   Japan .................................. 49-58260

[51] Int. Cl.² .......................................... F02B 75/10
[52] U.S. Cl. .................................. 60/282; 123/52 M
[58] Field of Search ...................... 60/282; 123/52 M

[56] References Cited

U.S. PATENT DOCUMENTS

| 1,402,886 | 1/1922 | Peterson | 123/52 M |
| 1,975,989 | 10/1934 | Timian | 123/52 M |
| 2,001,895 | 5/1935 | Timian | 123/52 M |
| 2,011,994 | 8/1935 | Ball | 123/52 M |
| 2,065,630 | 12/1936 | Timian | 123/52 M |
| 2,137,802 | 11/1938 | Ginn | 123/52 M |
| 3,811,416 | 5/1974 | Gospodar | 123/52 M |
| 3,827,237 | 8/1974 | Linder | 60/276 |

FOREIGN PATENT DOCUMENTS 771,649  4/1957  United Kingdom ............ 123/198 F

Primary Examiner—Douglas Hart

[57] ABSTRACT

An intake manifold of a multi-cylinder internal combustion engine is constructed so as to feed a rich air-fuel mixture into certain cylinders, and a lean mixture into the others.

2 Claims, 11 Drawing Figures

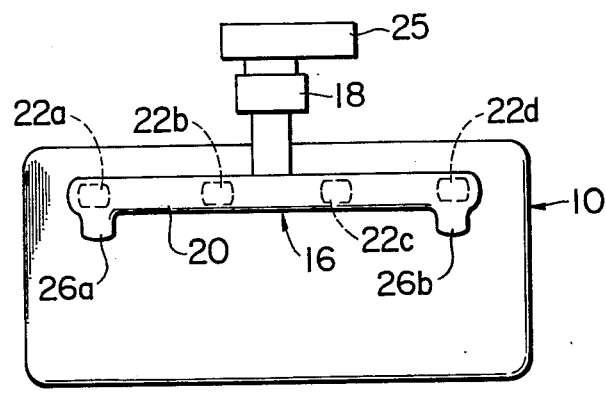
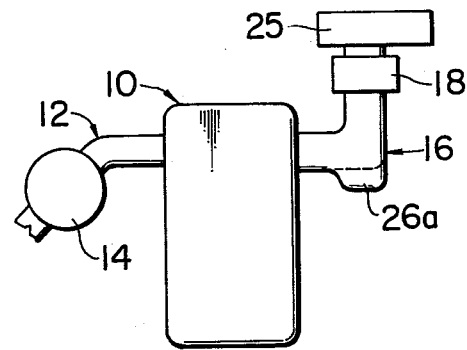
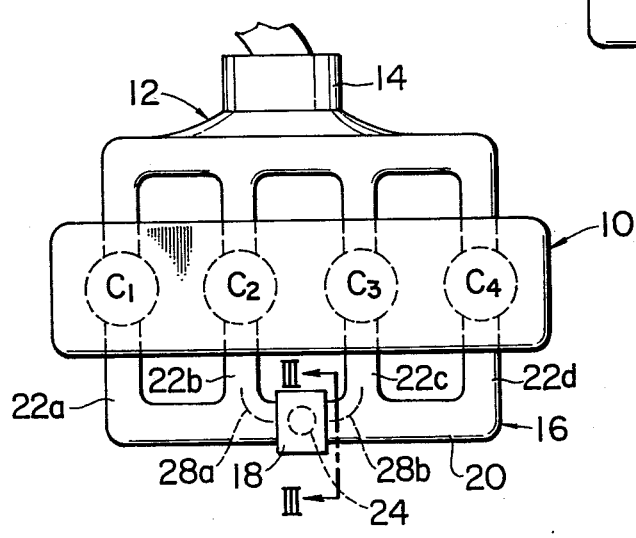

MULTI-CYLINDER INTERNAL COMBUSTION ENGINE

This invention relates to an improvement of a multi-cylinder internal combustion engine operated on air fuel mixtures richer and leaner than the stoichiometric mixture.

It is well known in the art that the highest concentration of nitrogen oxides in exhaust gases of an internal combustion engine results when the engine is operated on near an air-fuel mixture of the stoichiometric air-to-fuel ratio. It is also well known that an after-burner for purifying the exhaust gases from the engine, functions effectively by introducing and burning therein combustibles such as carbon monoxide and hydrocarbons in the form of unburned fuel. This results from supplying the combustion chambers with an air-fuel mixture far richer than the stoichiometric mixture.

In view of these tendencies, it has already been proposed that a multi-cylinder internal combustion engine be operated by supplying an air-fuel mixture far richer than stoichiometric into a certain number of cylinders and an air-fuel mixture far leaner than stoichiometric into the remaining cylinders.

However, in the prior art, the multi-cylinder internal combustion engine has required two carburetors for feeding air-fuel mixtures far richer and leaner than stoichiometric, respectively, and two sets of intake manifolds therefor. This inevitably results in complexity in production and high cost of the product.

It is, therefore, a principal object of the present invention to provide an improved multi-cylinder internal combustion engine which emits exhaust gases containing only a small amount of noxious constituents such as nitrogen oxides, carbon monoxide and hydrocarbons.

It is another object of the present invention to provide an improved multi-cylinder internal combustion engine in which a certain number of the cylinders are fed with an air-fuel mixture leaner than stoichiometric and the remaining cylinders are fed with an air-fuel mixture richer than stoichiometric by using only one carburetor.

Other objects and features of the improved multicylinder internal combustion engine according to the present invention will be more apparent from the following description taken in conjunction with the accompanying drawings in which like reference numerals designate corresponding parts and elements throughout the drawings in which:

FIG. 4 is a schematic plan view of a third preferred embodiment of the present invention similar to that of FIG. 1 but showing another type of intake manifold;

FIG. 5 is a schematic section view of the engine of FIG. 4;

FIG. 6 is a schematic plan view of a fourth preferred embodiment of the present invention similar to that of FIG. 1 by showing further type of intake manifold;

Figure 8:
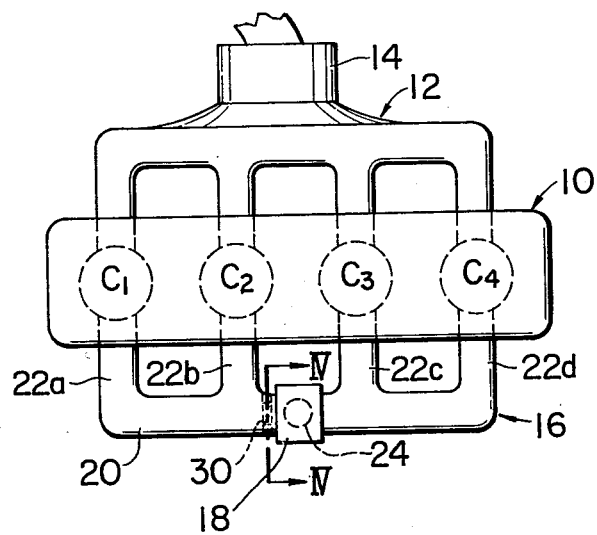
FIG. 8 is a schematic plan view of a fifth preferred embodiment of the present invention similar to that of FIG. 1 but showing further type of intake manifold.
Figure 9:
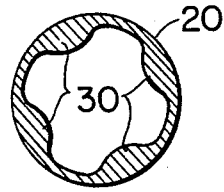
FIG. 9 is an enlarged cross-sectional view taken on line IV of FIG. 8.
Figure 10:
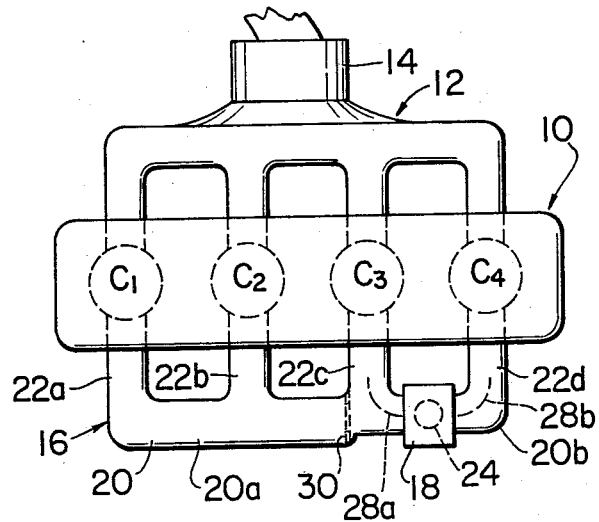
Figure 11:
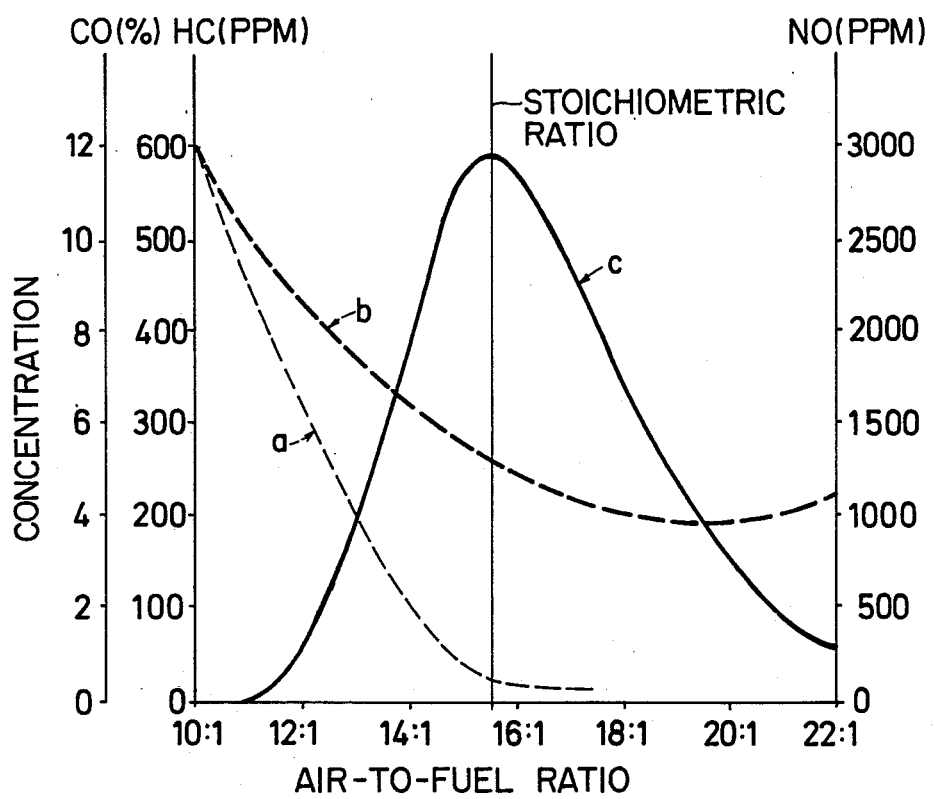

FIG. 10 is a schematic plan view of a sixth preferred embodiment of the present invention in which an intake manifold has features of the embodiments of FIGS. 1 to 9; and FIG. 11 is a graph showing a typical example of the relationship between the concentrations of carbon monoxide, hydrocarbons and nitrogen oxides in the exhaust gases from the engine and the air-to-fuel ratios of the mixtures fed into the engine.

Figure 1:
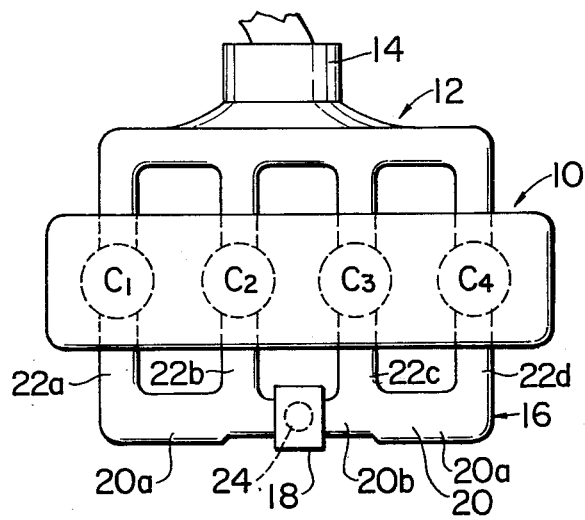
FIG. 1 is a schematic plan view of a first preferred embodiment of the present invention in which a four-cylinder internal combustion engine is equipped with a particular type of intake manifold.
Figure 2:
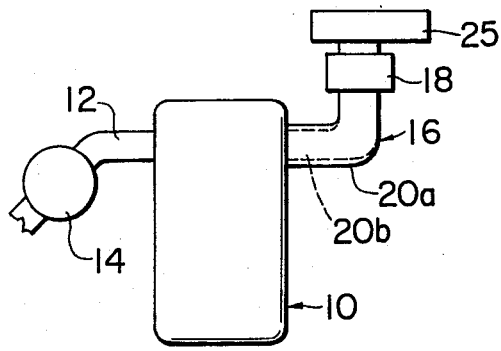
FIG. 2 is a schematic section view of the engine of FIG. 1.

Referring now to FIGS. 1 and 2, there is shown a first preferred embodiment of the present invention in which a four-cylinder internal combustion engine 10 has a first group of cylinders $C_1$ and $C_4$ and a second group of cylinders $C_2$ and $C_3$. The exhaust ports (not shown) of all the cylinders $C_1$ to $C_4$ communicate through an exhaust manifold 12 with an afterburner 14 for burning noxious constituents in the exhaust gases discharged from the cylinders. While, the intake ports (not shown) of all the cylinders $C_1$ to $C_4$ communicate through an intake manifold 16 with a carburetor 18 for feeding an air-fuel mixture into the cylinders. The intake manifold 16 includes a main runner 20 which has two enlarged portions 20a and a slender portion 20b interposed between the enlarged portions 20a. The enlarged portions 20a have cross-sectional area larger than that of the slender portion 20b. A first group of branch runners 22a and 22d branches off from the enlarged portions 20a of the main runner 20 and communicate the main runner 20 with the intake ports of the first group of cylinders $C_1$ and $C_4$. A second group of branch runners 22b and 22c branches off from the slender portion 20b of the main runner 20 and communicate the main runner 20 with the intake ports of the second group of cylinders $C_2$ and $C_3$. In this specification, first and second portions of the main runner 20 refers to the portions to which the first and second groups of branch runners are directly connected, respectively. Indicated in phantom at 24 is an induction opening 24 or the bore of a riser opened through the slender portion 20b through which opening the main runner 20 is communicated to the air-fuel mixture induction passage (not shown) of the carburetor 18 to induct the air-fuel mixture from the carburetor 18 into the intake manifold 20. Mounted on the carburetor 18 in FIG. 2 is an air-filter 25 for removing dust.

With the arrangement described hereinabove, when the engine 10 is operated and the carburetor 18 feeds the air-fuel mixture through the opening 24 into the intake manifold 20, the fuel constituents having a relatively low specific gravity or the fuel which is easy to vaporize in the air-fuel mixture is directly inducted into each of the cylinders, while the fuel constituents having a relatively high specific gravity or the fuel which is difficult to vaporize flows in the form of liquid stream on the inner surface of the intake manifold 20 toward the each of the cylinders. This liquid stream is moved by the intake air passing through the intake manifold 16. The rate of flow of fuel of high specific gravity toward the first group of cylinders $C_1$ and $C_4$ decreases due to low flow rate of the intake air resulting from the relatively large cross-sectional area of the enlarged portions 20a and therefore is retained on the inner surface of the enlarged portions 20a. On the contrary, the fuel of high specific gravity toward the second group of cylinders $C_2$ and $C_3$ can flow at relatively high flow rate due to high flow rate of the intake air resulting from the relatively small cross-sectional area of the slender portion 20b and is forced to be introduced into the second group of branch runners 22b and 22c without retention thereof on the inner surface of the slender portion 20b. Accordingly, the second group of cylinders $C_2$ and $C_3$ are fed with richer air-fuel mixture than that of the first group of cylinders $C_1$ and $C_4$.

It will be understood that the first group of cylinders $C_1$ and $C_4$ are fed with an air-fuel mixture leaner than stoichiometric and the second group of cylinders $C_2$ and $C_3$ are fed with an air-fuel mixture richer than stoichiometric by setting the carburetor 18 to deliver a suitable air-fuel mixture. Thus, the engine 10 operated outside of the air-fuel mixture of stoichiometric air-to-fuel ratio discharges exhaust gases containing only a small amount of noxious nitrogen oxides, which is apparent from FIG. 11 where curves a, b and c indicate the concentrations of carbon monoxide, hydrocarbons and nitrogen oxides, respectively, in the exhaust gases with respect to the air-to-fuel ratios of the air-fuel mixtures fed into the engine. In addition, since the first group of cylinders $C_1$ and $C_4$ discharge the exhaust gases containing a relatively high concentration of oxygen gas while the second group of cylinders $C_2$ and $C_3$ discharge the exhaust gases containing a relatively high concentration of carbon monoxide and hydrocarbons, the gases from the both group of cylinders are mixed together and burned effectively to decrease the carbon monoxide and hydrocarbons emission from the engine.

Figure 3:
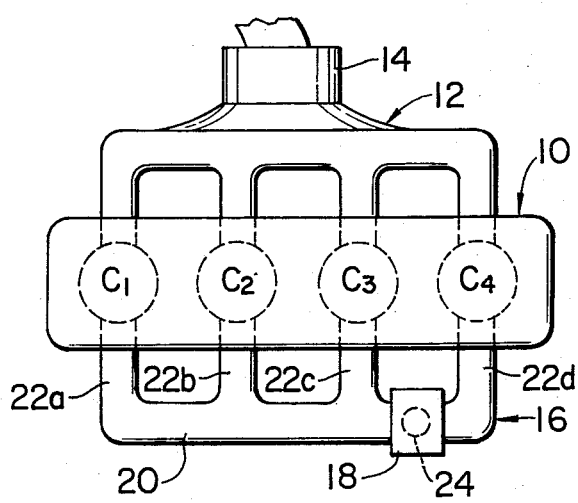
FIG. 3 is a schematic plan view of a second preferred embodiment of the present invention similar to that of FIG. 1 but showing another type of intake manifold.

FIG. 3 illustrates a second preferred embodiment of the present invention which is similar to the embodiment shown in FIGS. 1 and 2 except that the main runner 20 has the same cross-sectional area throughout the length thereof. Additionally, the induction opening 24 is located at a portion of the main runner 20 between connecting portions of a second group of branch runners 22c and 22d. As shown, a first group of branch runners 22a and 22b are far from the induction opening 24 compared with the second group of branch runners 22c and 22d. With this arrangement, the liquid fuel of relatively high specific gravity from the carburetor 18 flows along the wall surface of the intake manifold 16 toward the cylinder at the intake stroke with the air passing through the intake manifold 16, when the cylinders $C_1$ and $C_2$ are at their intake strokes, the liquid fuel flows inside of the main runner 20 toward the first group of branch runners 22a and 22b. However, since the first group of branch runners 22a and 22b are relatively far from the carburetor 18, the liquid fuel towards the first branch runner 22a and 22b is forced to move towards the second group of branch runners 22c and 22d and sucked into the second group of cylinders $C_3$ and $C_4$ at the intake strokes of the cylinders $C_3$ and $C_4$ before the liquid fuel reaches the first group of branch runners 22a and 22b. Accordingly, the first group of cylinders $C_1$ and $C_2$ are fed with a smaller amount of fuel, whereas the second group of cylinders $C_3$ and $C_4$ are fed with a larger amount of the available fuel from the carburetor. Therefore, it will be understood that a first group of cylinders $C_1$ and $C_2$ are fed with the air-fuel mixture leaner than stoichiometric and a second group of cylinders $C_3$ and $C_4$ are fed with the air-fuel mixture richer than stoichiometric by setting the carburetor 18 to deliver a suitable air-fuel mixture.

FIGS. 4 and 5 illustrate a third preferred embodiment of the present invention which is similar to the embodiment shown in FIGS. 1 and 2 except that the main runner 20 of the intake manifold 16 has at its floor portion pits 26a and 26b which are adjacent to the connecting portion of the first group of branch runners 22a and 22d. Additionally, the main runner 20 has the same cross-sectional area throughout the length thereof. With this arrangement, the fuel of high specific gravity flowing toward the first group of branch runners 22a and 22d is retained within the pits 26a and 26b of the main runner 20 and therefore a smaller amount of the heavy fuel is inducted into the first group of branch runners 22a and 22d than into the second group of branch runners 22b and 22c. Accordingly, it will be understood that the first group of cylinders $C_1$ and $C_4$ (not shown) communicated with the first group of branch runners are fed with the air-fuel mixture leaner than stoichiometric and the second group of cylinders $C_2$ and $C_3$ (not shown) communicated with the second group of branch runners are fed with the air-fuel mixture richer than stoichiometric by setting the carburetor 18 to deliver a suitable air-fuel mixture.

Figure 7:
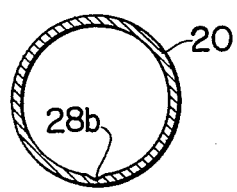
FIG. 7 is an enlarged cross-sectional view taken on line III of FIG. 6.

FIGS. 6 and 7 illustrate a fourth preferred embodiment of the present invention which is similar to the embodiment shown in FIGS. 1 and 2 except that the main runner 20 of the intake manifold 16 has longitudinal grooves at its floor portion which grooves 28a and 28b are extended from a portion of the main runner 20 adjacent to the induction opening 24 into the second group of branch runners 22b and 22c. Additionally, the main runner 20 has the same cross-sectional area throughout the length thereof. With this arrangement, a larger amount of the fuel of high specific gravity is forced to flow through the grooves 28a and 28b into the second group of branch runners 22b and 22c than into the first group of branch runners 22a and 22b. Therefore, it will be understood that the first group of cylinders $C_1$ and $C_4$ are fed with the air-fuel mixture leaner than stoichiometric and the second group of cylinders $C_2$ and $C_3$ are fed with the air-fuel mixture richer than stoichiometric by setting the carburetor to deliver a suitable air-fuel mixture having suitable air-to-fuel ratio for this purpose.

FIGS. 8 and 9 illustrate a fifth preferred embodiment of the present invention which is similar to the embodiment shown in FIGS. 1 and 2 except that the main runner 20 of the intake manifold 16 has at the inner surface thereof at least one projection 30 or projection plate which is located at a portion of the main runner 20 between the induction opening 24 and the connecting portion of the branch runner 22b. In this instance, the projection 30 includes four projection plate as shown in FIG. 9. In addition, the main runner 20 is constructed to have same cross-sectional area throughout the length thereof. With this arrangement, the flow of the fuel of high specific gravity toward the first group of branch runners 22a and 22b is obstructed by the projection plate 30 and therefore a smaller amount of the fuel of high specific gravity is inducted into the first group of branch runners 22a and 22b than into the second group of branch runners 22c and 22d. Accordingly, it will be understood that the first group of cylinders $C_1$ and $C_2$ are fed with the air-fuel mixture leaner than stoichiometric and the second group of cylinders $C_3$ and $C_4$ are fed with the air-fuel mixture richer than stoichiometric by setting the carburetor 18 to deliver a suitable air-fuel mixture.

FIG. 10 illustrates a sixth preferred embodiment of the present invention which includes in combination features of the first to fifth preferred embodiments described hereinbefore, the main runner 20 of the intake manifold 16 includes the enlarged portion 20a and the slender portion 20b. The first group of branch runners 22a and 22b are branched off from the enlarged portion 20a and communicate the enlarged portion 20a with the first group of cylinders $C_1$ and $C_2$. While, the second group of branch runners 22c and 22d are branched off from the slender portion 20b and communicate the slender portion 20b with the second group of cylinders $C_3$ and $C_4$. The projection plate 30 similar to that shown in FIG. 9 is located at the inner surface of the main runner 20 and at the border portion of the enlarged and slender portions 20a and 20b. The grooves 28a and 28b similar to that shown in FIG. 7 are formed on the floor portion of the slender portion 20b and extends from the portion adjacent to the induction opening 24 into the second group of branch runners 22c and 22d, respectively. It will be understood from the foregoing description that the first group of cylinders $C_1$ and $C_2$ are fed with the air-fuel ratio leaner than stoichiometric and the second group of cylinders $C_3$ and $C_4$ are fed with the air-fuel mixture richer than stoichiometric by setting the carburetor 18 to deliver a suitable air-fuel mixture.

What is claimed is:

1. An in-line multi-cylinder internal combustion engine having a first group of cylinders consisting of at least half the number of total cylinders, the first group of cylinders being separated into two groups, and a second group of cylinders consisting of the remaining cylinders and being positioned between the two groups of the first group of cylinders, the engine being followed by an afterburner for burning the unburned consituents contained in the exhaust gases discharged from all the cylinders, comprising:

an intake manifold including a first group of branch runners connected to the first group of cylinders, a second group of branch runners connected to the second group of cylinders, and a main runner having a first portion directly connecting to the first group of branch runners, the first portion being separated into two parts which have same cross-sectional area substantially throughout their lengths, and a second portion directly connected to the second group of branch runners and positioned interposed between the two parts of the first portion, the second portion having the same cross-sectional area substantially throughout its length, said last mentioned cross-sectional area being smaller than that of the first portion, the two parts of the first portion and the second portion being axially aligned, and an induction opening through which an air-fuel mixture is inducted into said intake manifold; and a carburetor for producing the air-fuel mixture and supplying the mixture into all the cylinders through said intake manifold, said carburetor having an air-fuel mixture induction passage which is communicated with the induction opening formed in the second portion of the main runner of said intake manifold.

2. An in-line four-cylinder internal combustion engine having first, second, third and fourth cylinders, the second and third cylinders being positioned adjacent to each other and interposed between the first and fourth cylinders, the engine being followed by an afterburner for burning the unburned constituents contained in the exhaust gases discharged from all the cylinders, comprising:

an intake manifold including first and fourth branch runners which respectively connect to the first and fourth cylinders, second and third branch runners which respectively connect to the second and third cylinders, and a main runner having first portion to which the first branch runner is directly connected, a second portion to which the second and third branch runners are directly connected, a third portion to which the fourth branch runner is directly connected, the first and third portions having the same cross-sectional area substantially their lengths and the second portion having the same cross-sectional area substantially through its length which cross-sectional area is smaller than that of the first and third portions, the second portion being positioned interposed between the first and second portions, the first, second, and third portions being straight and axially aligned, and an induction opening through which air-fuel mixture is inducted into said intake manifold; and a carburetor for producing the air-fuel mixture and supplying the mixture into all the cylinders through said intake manifold, said carburetor having an air-fuel mixture induction passage which is communicated with the induction opening formed in the second portion of the main runner of said intake manifold.

* * * * *